Figure 1:
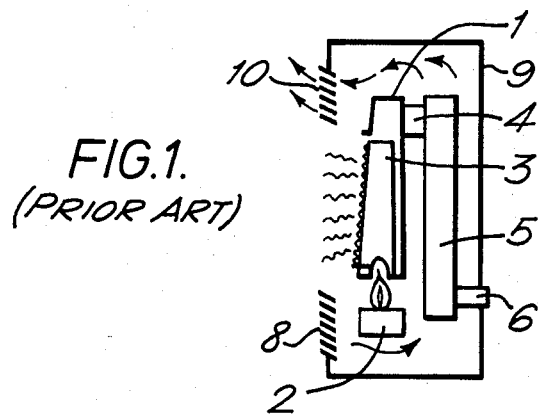

United States Patent [19]
Niknejad et al.

[11] Patent Number: 4,531,508
[45] Date of Patent: Jul. 30, 1985

[54] GAS-FIRED CONVECTOR OR CONVECTOR/RADIANT ROOM HEATING APPLIANCE

[75] Inventors: Jalil Niknejad; Ming-Biu Tung, both of London, England

[73] Assignee: British Gas Coporation, London, England

[21] Appl. No.: 633,914

[22] Filed: Jul. 24, 1984

[30] Foreign Application Priority Data

Nov. 1, 1983 [GB] United Kingdom ............... 8329152

[51] Int. Cl.³ ............................................. F24C 3/00
[52] U.S. Cl. ................................. 126/90 R; 126/92 C
[58] Field of Search ................ 126/92 R, 92 C, 91 R, 126/90 R

[56] References Cited

U.S. PATENT DOCUMENTS 1,942,936  1/1934  Reznor ............................. 126/90 R
1,991,513  2/1935  Moore et al. ..................... 126/90 R
2,603,208  7/1952  Beauchamp ....................... 126/90 R

FOREIGN PATENT DOCUMENTS 928676  6/1963  United Kingdom ............. 126/90 R

*Primary Examiner*—Carroll B. Dority, Jr.
*Attorney, Agent, or Firm*—Oblon, Fisher, Spivak, McClelland & Maier

[57] ABSTRACT

A gas-fired condensing convector or convector/radiant room heating appliance comprising a sealed combustion chamber 12 communicating with a baffled heat exchanger 21, a gas burner 13 within the chamber 12 fed with forced or induced air for combustion from a toroidal air blower 16, a convector fan 25 for circulating air over at least the heat exchanger, and a small bore flue pipe 24 terminating in a two-way outlet terminal means for the discharge of waste gases and liquid condensate. The thermal efficiency of the appliance is at least 90% and the temperature of the waste gases is below the dew point and at less than 50° C.

9 Claims, 7 Drawing Figures

U.S. Patent  Jul. 30, 1985  Sheet 1 of 3  4,531,508

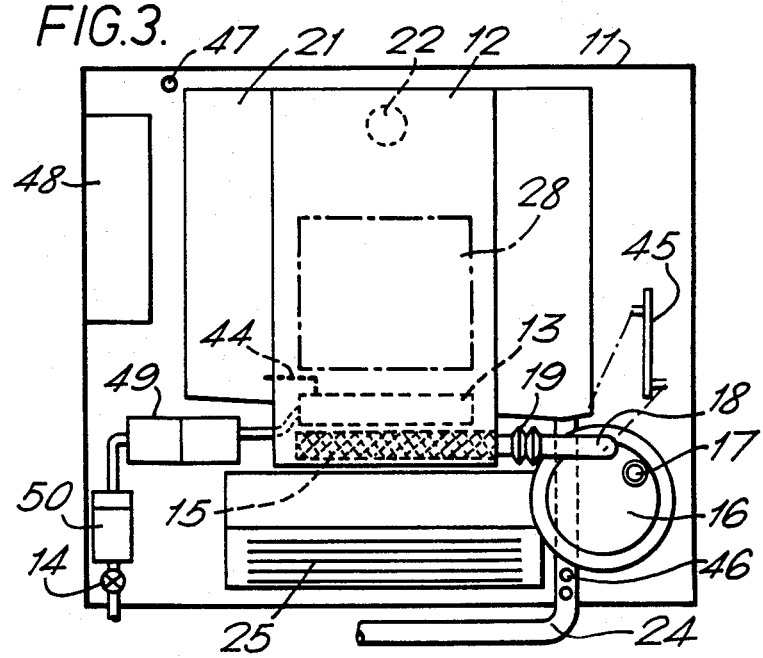
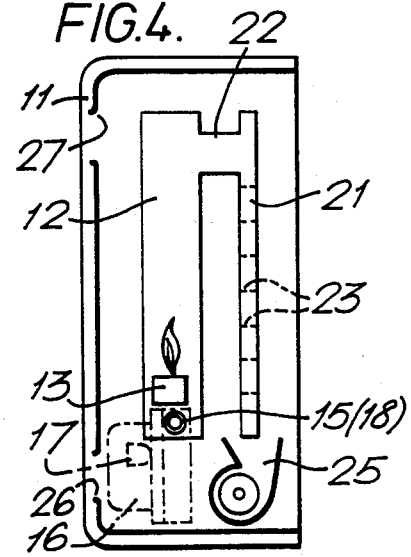
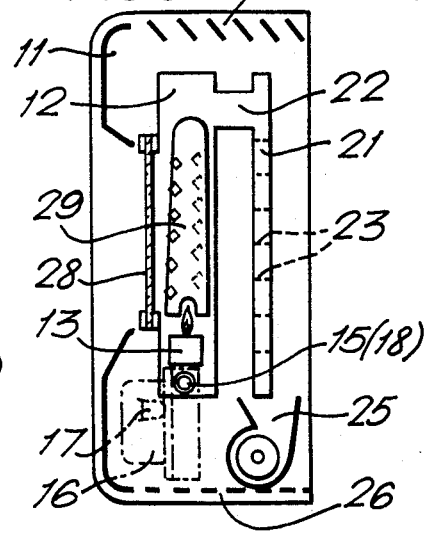

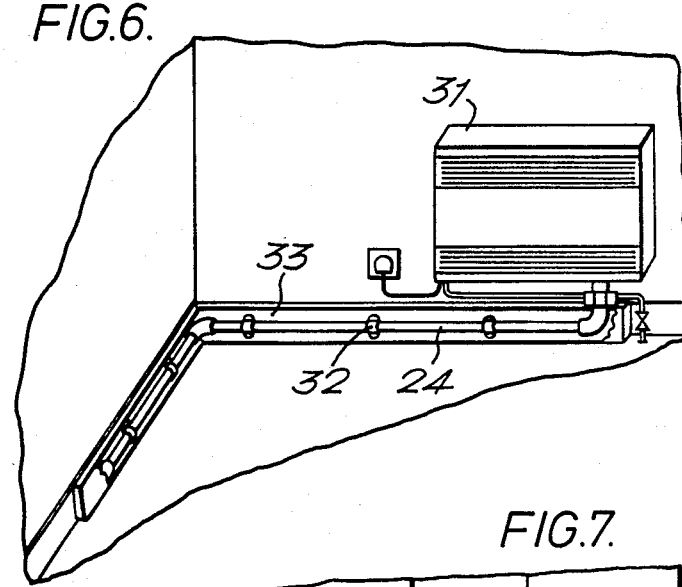
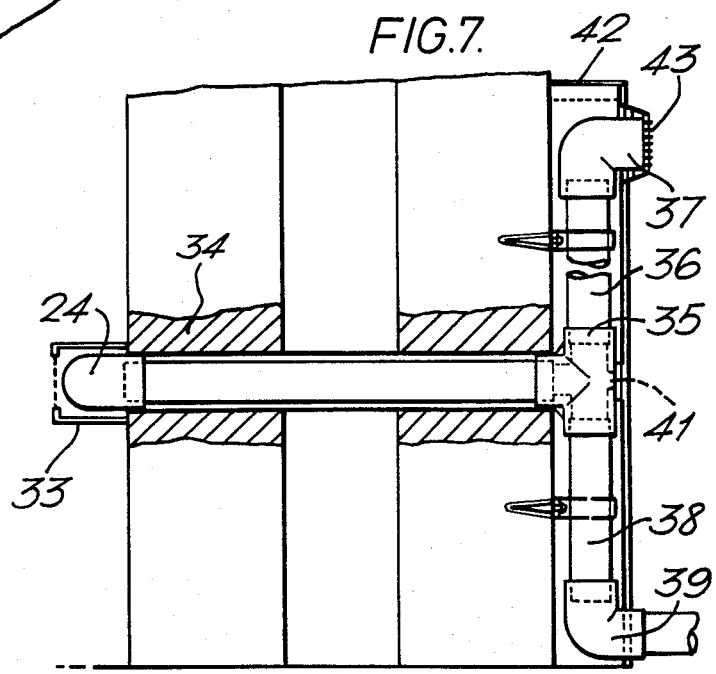

GAS-FIRED CONVECTOR OR CONVECTOR/RADIANT ROOM HEATING APPLIANCE

This invention relates to convector or convector/radiant room heating appliances of the kind in which a gas burner is used to heat the surfaces of a heat exchanger, the heat energy therefrom being transferred to the room to be heated either indirectly by convective hot air currents or directly by radiation, and in some cases by both.

The heat exchanger may be in the form of purposely designed metal surfaces or a shaped metal box into which the burner products are directed. The convected air currents can also be assisted by a ventilation fan to increase air circulation. Conventionally, the waste products of the burner gases are discharged outside the building through a flue which is usually a brick chimney, pre-cast flue blocks, asbestos piping or balanced flue terminal. With such flues the only force available for overcoming the resistance to flow of the gases is the natural 'pull' or boyancy force generated by the chimney. In the case of a balanced flue this force is even less. For this reason heat exchangers have hitherto been designed to give minimum flow resistance so as to prevent exhaust product gas spillage into the room in the case of an open front radiant gas fire, and to prevent poor combustion in a room-sealed heater. Such restrictions on gas-fired appliances have meant that the thermal efficiency of a gas-fired sealed heater is not more than 75%, and only around 55% for an open front gas fire, the corresponding flue gas temperature being between 150° C. and 300° C. which is a serious waste of heat potential when viewed in the light of world demand for energy conservation.

A known gas-fired convector/radiant room heating appliance, which does not overcome the aforesaid disadvantages, comprises a gas burner, a combustion chamber into which combustion products from the burner are directed, a heat exchanger located adjacent to but spaced from the combustion chamber and over whose surfaces ambient air can flow, a passageway connecting the heat exchanger with the combustion chamber for the flow of combustion products from the top of the chamber to the top of the heat exchanger, and a flue outlet connected to the bottom of the heat exchanger through which waste combustion product gases can be discharged.

An object of the present invention is to provide a compact, more efficient appliance of this kind which can be positioned almost anywhere in a room having an outside wall.

According to the present invention, in a gas-fired condensing convector or convector/radiant room heating appliance, the combustion chamber and the heat exchanger are sealed inter-communicating box-like units, the gas burner is contained within the sealed combustion chamber, combustion air for the gas burner is provided by a high pressure air blower, a convector fan is provided beneath the heat exchanger for producing air flow over the surfaces of at least the heat exchanger, and the flue outlet is provided by a length of small bore pipe through which the waste product gases and resultant product condensate liquid are forceably discharaged therealong in a substantially horizontal direction by the draught generated by said air blower to a terminal outlet means connected to the small bore flue pipe and located outside the building in which the room is situated, the whole arrangement being such that the thermal efficiency of the appliance is at least 90% of the potential heat source available at the burner, and that the temperature of the waste product gases leaving the heat exchanger is below the dew point and at less than 50° C.

Figure 2:
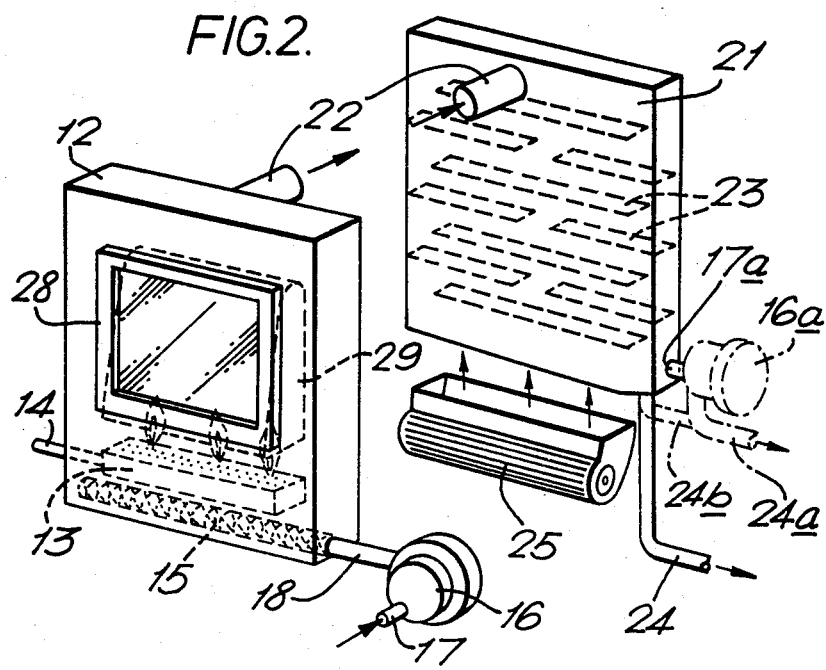

Embodiments of the invention will now be described by way of example with reference to the accompanying drawings in which:

FIG. 1 (Prior Art) is a diagrammatic sectional side view of a known type of gas-fired convector room heating appliance with which the invention is concerned;

FIG. 2 is a diagrammatic exploded perspective view of the main component parts of a condensing gas-fired room heating appliance in accordance with the invention, FIG. 3 is a diagrammatic front view of the appliance with the front cover removed, FIGS. 4 and 5 are diagrammatic part sectional end views of two slightly different embodiments of the invention, FIG. 6 is a perspective representation of a corner of a room with an appliance installed, and FIG. 7 is a sectional view through the outside wall of a room showing the terminal outlet means for waste flue gases and liquid condensate.

The appliance shown in FIG. 1 (Prior Art) is that defined in the pre-characterising part of claim 1 and comprises a combustion chamber 1 open at its base and front and into which a burner 2 fires onto ceramic radiant elements 3. The hot combustion gases pass through a pipe 4 at the top of the combustion chamber 1 into and through a heat exchanger 5 and are thence exhausted through a flue outlet 6 communicating with a chimney. In this arrangement, ambient air in the room is both radiantly heated and heated by naturally convected currents of air passing through apertures 8 in the base of the appliance casing 9, over the heated surfaces of the heat exchanger and combustion chamber and out through apertures 10 in the top of the casing.

Referring now to FIGS. 2 to 5 the appliance comprises, a casing 11 housing a sealed box-like metal combustion chamber 12 containing an aerated gas burner 13 fed from a gas supply 14 and a wire mesh air distribution tube 15 located beneath the burner for distributing air for combustion to the burner, a high performance toroidal air blower 16 which delivers combustion air from an inlet 17 to the distribution tube 15 via an outlet 18 and flexible coupling 19, a heat exchanger 21 communicating with the combustion chamber 12 via a pipe 22 near the top thereof and having a plurality of baffle plates 23 arranged in staggered formation for causing the hot gases to take a tortuous path therethrough before passing into a flue pipe 24 formed of a small bore plastic tube, and a centrifugal fan 25 positioned beneath the heat exchanger 21 for circulating ambient air over the surfaces of the heat exchanger and possibly also the surfaces of the combustion chamber. The casing 11 is provided with air entry and exit apertures 26, 27 (FIGS. 4 and 5) to and from the casing interior both for the fan-assisted convected air currents and the combustion air.

The sealed combustion chamber 12 in the embodiment shown in FIG. 4 serves also as a heat transmitter for circulating ambient air currents and is therefore a pure convector room heater. In the embodiment shown in FIG. 2 and FIG. 5, the front part of the combustion chamber 12 is provided with a sealed transparent panel 28 through which radiant heat is transmitted from a ceramic radiant element 29 supported above the burner 13 within the chamber 12. In this case, the appliance will function as a convector/radiant room heater.

The appliance describe thus far with reference to the drawings where the toroidal blower 16 is positioned upstream of the chamber and heat exchanger is known as a forced draught heater. In this case cold air is sucked into the blower through its inlet 17 and is delivered at about 4 m³/hour and 5 mb of static head pressure to the distribution tube 15. Thus, the entire heater system is pressurised as it is downstream of the blower and therefore care must be exercised in ensuring that the component parts of the system are adequately sealed to prevent any leakage of flue gases. Alternatively, the toroidal air blower 16a can be positioned downstream of the heat exchanger 21 (as shown in chain-dotted lines in FIG. 1) so that the air for combustion and the combustion product gases are sucked through the heating system into the blower via an inlet 17a and discharged therefrom to the small bore flue pipe 24a. In this way the entire system is depressurised by induced draught and the danger of any flue gas leakage from its component parts is virtually eliminated. Preferably, with this arrangement, an additional pipe 24b connecting the heat exchanger with the pipe 24a may be provided for directing condensate liquid product from the heat exchanger to be swept along with the forced flow of flue gases along the flue pipe 24a. Other kinds of air blowers could be used but suffer the disadvantages of having much larger physical sizes and higher noise levels.

Referring now to FIG. 6, this shows the heater 31 mounted on a suitable wall of the room with its small bore plastics flue pipe fastened by clips 32 inside a simulated skirting board 33 along the walls. At least 7 meters in length and eight 90° bends of the flue pipe can be accommodated in the installation. Referring also to FIG. 7, the flue pipe passes through a convenient external wall 34 and is coupled by a T-piece 35 to a flue terminal outlet means comprising an upper vertical plastics tube 36 terminating in an elbow piece 37 for the discharge of flue gases and a lower vertical plastic tube 38 terminating in an elbow piece 39 for draining the condensate product liquid. Preferably, the T-piece 35 is provided with an overflow hole 41 as a safeguard against the possible blockage of the drain tube 39. The upper and lower tubes 36, 38 are covered by a plastics trunking 42 and the elbow outlet 37 is protected by a guard 43.

The appliance will be provided with well known controls and fail-safe mechanisms such as for example (see FIG. 3) a burner flame sensor 44, a differential pressure switch 45, a flue gas limit stat 46, an air flow limit stat 47, a full sequential safety check controller 48, a double-acting solenoid gas valve 49, and a gas pressure regulator 50.

Particular advantageous feature of the present invention are:

(a) The use of a high performance toroidal air blower compensates for the inadequacy of the natural boyancy force of a conventional flue, is effective in damping flow resistance variation such as that caused by wind gusts at the flue terminal, and enables in conjunction with an effectively designed baffled heat exchanger to greatly increase the flow velocity and flow resistance whereby to extract the maximum heat transfer rate.

(b) As the burnt gases are very hot (500°–1200° C.) high grade heat transfer takes place in the combustion chamber but 30–50% of heat energy is still retained in the hot product gases leaving the chamber and entering the heat exchanger for further heat transfer with the result that less than 10% of the total available heat energy will be carried in the flue gases to the small bore flue pipe at a temperature of between 30°–50° C. which is below the dew point of the flue gas. The condensate thus formed is carried away under pressure by the flue gases into the flue pipe. The rate of condensation will depend on the effectiveness of the convector fan.

(c) The use of an air flow distribution tube for burner operation ensures that the pressure drop along the tube is much less than that across its walls which provides an even and economically distributed combustion air flow inside the combustion chamber.

(d) By greatly reducing the size of the flue pipe and by eliminating the need to insulate it because of its low operating temperature, it becomes possible to hide the flue pipe behind a simulated skirting board besides improving the aesthetic appearance of the flue terminal outside the building.

What we claim is:

1. A gas-fired convector or convector/radiant room heating appliance comprising, a gas burner, a combustion chamber with or without radiant elements into which the combustion products from the burner are directed, a heat exchanger located adjacent to but spaced from the combustion chamber over which ambient air can flow, a passageway connecting the heat exchanger with the combustion chamber for the flow of combustion products from the top of said combustion chamber to the top of said heat exchanger, and a flue outlet connected to the bottom of the heat exchanger through which waste combustion product gases can be discharged, the improvement wherein the appliance is a condensing gas-fired room heater and wherein the combustion chamber and the heat exchanger are sealed inter-communicating box-like units, the gas burner is contained within the sealed combustion chamber, combustion air for said burner is provided by a high pressure air blower, a convector fan is provided beneath the heat exchanger for providing air flow over the surfaces of at least the heat exchanger, and the flue outlet is provided by a length of small bore pipe through which the waste product gases and resultant product condensate liquid are forceably discharged therealong in a substantially horizontal direction by the draught generated by said air blower to a terminal outlet means connected to the small bore flue pipe and located outside the building in which the room is situated, the whole arrangement being such as to ensure that the thermal efficiency of the appliance is at least 90% of the potential heat source available at the burner and that the temperature of the waste product gases leaving the heat exchanger is below the dew point of gases and at less than 50° C.

2. An appliance according to claim 1 wherein the gas burner is an aerated burner, and wherein the combustion air from said blower is supplied from a perforate air redistribution tube located below said burner within the combustion chamber and connected to said blower.

3. An appliance according to claim 1, wherein the air blower is a toroidal blower arranged to generate approximately 5 mb of static head pressure and delivering approximately 4 m³/hour sufficient to overcome flow resistance of the system.

4. An appliance according to claim 1, wherein said blower is positioned upstream of the combustion chamber whereby the combustion chamber and heat exchanger is positively pressurised by forced draught flow.

5. An appliance according to claim 1, wherein said blower is positioned downstream of the heat exchanger whereby the combustion chamber and heat exchanger is negatively pressurised by induced draught flow.

6. An appliance according to claim 1, wherein the convector fan is a centrifugal fan.

7. An appliance according to claim 1, wherein radiant elements are supported within the combustion chamber above the burner; and a heat resistant transparent panel is sealed into the front wall of the chamber for the transmission of radiant heat therethrough.

8. An appliance according to claim 1, wherein the box-like heat exchanger is provided with a plurality of baffles extending between the vertical sides thereof so as to create maximum turbulence and therefore maximum heat transfer rate from the hot combustion gases.

9. An appliance according to claim 1, wherein said terminal flue outlet means comprises a short length of pipe positioned substantially vertically and adapted by means to be connected to said small bore flue pipe so as to provide an upwardly directed pipe section through which the waste flue gases are discharged and a downwardly directed pipe section down which the condensate liquid is drained, the terminal pipe also being rotated with an aperture in the vicinity of the connection means with said flue pipe so as to provide an overflow outlet for the condensate liquid should the downwardly directed pipe sections become blocked.

* * * * *